United States Patent
Kim et al.

(10) Patent No.: US 11,591,491 B2
(45) Date of Patent: Feb. 28, 2023

(54) INK COMPOSITION FOR INKJET PRINTED STEEL PLATE, INKJET PRINTED STEEL PLATE USING THE SAME, AND METHOD FOR PRODUCING INKJET PRINTED STEEL PLATE

(71) Applicant: POSCO, Pohang-si (KR)

(72) Inventors: Jin-Tae Kim, Gwangyang-si (KR);
Jung-Hwan Lee, Gwangyang-si (KR);
Ha-Na Choi, Gwangyang-si (KR);
Yon-Kyun Song, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 176 days.

(21) Appl. No.: 15/751,634

(22) PCT Filed: Aug. 12, 2016

(86) PCT No.: PCT/KR2016/008944
§ 371 (c)(1),
(2) Date: Feb. 9, 2018

(87) PCT Pub. No.: WO2017/030334
PCT Pub. Date: Feb. 23, 2017

(65) Prior Publication Data
US 2018/0230323 A1  Aug. 16, 2018

(30) Foreign Application Priority Data
Aug. 14, 2015 (KR) .................. 10-2015-0115002

(51) Int. Cl.
*C09D 11/38* (2014.01)
*C09D 11/101* (2014.01)
(Continued)

(52) U.S. Cl.
CPC .............. *C09D 11/38* (2013.01); *B41M 1/28* (2013.01); *B41M 5/0011* (2013.01);
(Continued)

(58) Field of Classification Search
CPC ..... C09D 11/30; C09D 11/101; C09D 11/102; C09D 11/107; C09D 11/38; B41M 1/28;
(Continued)

(56) References Cited

U.S. PATENT DOCUMENTS

2003/0069329 A1 * 4/2003 Kubota ................ B41J 11/0015
523/160
2004/0024078 A1  2/2004 Itoh et al.
(Continued)

FOREIGN PATENT DOCUMENTS

CN  101396948  4/2009
EP  2377901  10/2011
(Continued)

OTHER PUBLICATIONS

Machine Translation of JP 2012-162688 (Year: 2012).*
(Continued)

*Primary Examiner* — Christopher M Polley
*Assistant Examiner* — Sathavaram I Reddy
(74) *Attorney, Agent, or Firm* — Cantor Colburn LLP (57) ABSTRACT

Provided is an ink composition for an inkjet print steel plate, an inkjet print steel plate using the same, and a method for producing an inkjet print steel plate. The ink composition comprises: a linear acrylate-based oligomer; a reactive acrylate-based monomer; an ultraviolet curable initiator; at least one selected from the group consisting of a dye and a pigment; and at least one selected from the group consisting of an antioxidant, an antifoaming agent, and a dispersant.

18 Claims, 3 Drawing Sheets

(51) Int. Cl.
  *C09D 11/30* (2014.01)
  *B41M 1/28* (2006.01)
  *C09D 11/102* (2014.01)
  *B41M 5/00* (2006.01)
  *B41M 7/00* (2006.01)
  *C09D 11/107* (2014.01)

(52) U.S. Cl.
  CPC ........ *B41M 5/0023* (2013.01); *B41M 5/0058* (2013.01); *B41M 5/0088* (2013.01); *B41M 7/0036* (2013.01); *B41M 7/0081* (2013.01); *C09D 11/101* (2013.01); *C09D 11/102* (2013.01); *C09D 11/107* (2013.01); *C09D 11/30* (2013.01); *B41M 2205/40* (2013.01)

(58) Field of Classification Search
  CPC .............. B41M 5/0011; B41M 5/0023; B41M 5/0058; B41M 5/0088; B41M 7/0036; B41M 7/0081; B41M 2205/40
  See application file for complete search history.

(56) References Cited

U.S. PATENT DOCUMENTS

| | | |
|---|---|---|
| 2005/0136252 A1 | 6/2005 | Chisholm et al. |
| 2005/0176849 A1 | 8/2005 | Yang |
| 2007/0122723 A1 | 5/2007 | Hopper et al. |
| 2009/0118418 A1 | 5/2009 | Nakano et al. |
| 2011/0227992 A1* | 9/2011 | Matsumoto .......... C09D 11/101 347/21 |
| 2011/0234681 A1* | 9/2011 | Nakane ................ B41M 5/0023 347/20 |
| 2013/0065996 A1* | 3/2013 | Ganapathiappan ....... C09C 1/46 524/219 |
| 2014/0004369 A1 | 1/2014 | Anzai et al. |
| 2014/0015894 A1* | 1/2014 | Sisler ................... C09D 133/10 347/20 |

FOREIGN PATENT DOCUMENTS

| | | |
|---|---|---|
| JP | 2005223323 | 8/2005 |
| JP | 2006306008 | 11/2006 |
| JP | 2097507610 | 3/2007 |
| JP | 2009274341 | 11/2009 |
| JP | 2011195747 | 10/2011 |
| JP | 2012144582 | 8/2012 |
| JP | 2012162688 | 8/2012 |
| KR | 20060072475 | 6/2006 |
| KR | 20060072476 | 6/2006 |
| KR | 20060126515 | 12/2006 |
| KR | 20070032538 | 3/2007 |
| KR | 100925632 | 11/2009 |
| KR | 101170872 | 8/2012 |
| KR | 101403986 | 6/2014 |
| KR | 20150006714 | 1/2015 |
| KR | 101510556 | 4/2015 |
| KR | 101518619 | 5/2015 |
| KR | 101518639 | 5/2015 |
| WO | 2006051634 | 5/2006 |
| WO | 2012133667 | 10/2012 |

OTHER PUBLICATIONS

European Search Report—European Application No. 16837276.1, dated Apr. 26, 2018, citing EP 2 377 901, KR 101 403 986 and KR 2006 0072475.
International Search Report—PCT/KR2016/008944 dated Nov. 23, 2016.
Japanese Office Action—Japanese Application No. 2018-506922 dated Mar. 5, 2019, citing JP 2012-162688, WO 2012/133667, JP 2012-144582, JP 2011-195747, KR 10-2006-0072475, JP 2006-306008 and WO 2006-051634.
Japanese Office Action—Japanese Application No. 2020-020293 dated Jan. 19, 2021, citing JP 2007-507610,.
Chinese Office Action—Chinese Application No. 201680048314.6 dated May 6, 2020, citing JP 2012144582, CN 101396948, and Polymer Physics.
Polymer Physics (Revised Edition), First Edition, He Manjun, et al., pp. 8 and 181, Fudan University Press.

* cited by examiner

INK COMPOSITION FOR INKJET PRINTED STEEL PLATE, INKJET PRINTED STEEL PLATE USING THE SAME, AND METHOD FOR PRODUCING INKJET PRINTED STEEL PLATE

TECHNICAL FIELD

The present inventive concept relates to an ink composition for an inkjet printed steel plate, an inkjet printed steel plate using the same, and a method of producing an inkjet printed steel plate.

BACKGROUND ART

Conventional patterned printed steel plates can be divided into silkscreen printed steel plates and roll printed steel plates. However, such printed steel plates are not widely applied to products requiring high resolution or a variety of colors, and only repetitive patterns may be produced. In particular, in order to implement a variety of colors, a separate silkscreen frame or a separate etched roll is required for each color. In addition, it may be difficult to print each color on a precise location, resulting in a high defect rate.

However, when an inkjet printing process is used as a method of printing a steel plate, it may be difficult to ensure printability and adhesion of a conventional inkjet ink on a steel plate lacking absorptiveness.

Further, it may be difficult to ensure workability and a high degree of hardness at the same time. An ultraviolet (UV) curable resin solution may be used to print patterns having high resolution on a steel plate at high speed. However, it may be difficult to dispense a conventional UV-curable resin solution for coating a steel plate in the inkjet printing process due to high viscosity thereof. Therefore, a conventional UV-curable resin solution for coating a steel plate has poor applicability.

DISCLOSURE

Technical Problem

An aspect of the present inventive concept may provide an ink composition for an inkjet printed steel plate having excellent ink dispensability and printing workability, maintaining low viscosity without adding an organic solvent, and applied to fabricate an inkjet printed steel plate having high resolution, high hardness, as well as excellent coating adhesion, and an inkjet printed steel plate using the same.

Another aspect of the present inventive concept may provide an ink composition for an inkjet printed steel plate including an ultraviolet (UV) curable rein composition for forming a coating layer having coating adhesion and minimized drawbacks of high hardness on a steel plate such as a cold-rolled steel plate, a hot-rolled steel plate, a galvanized steel plate, an aluminized steel plate, a color-coated steel plate, a stainless steel plate, a magnesium steel plate, an aluminum steel plate, a zinc steel plate, and a titanium steel plate. The ink composition for the inkjet printed steel plate may have excellent ink dispensability and printing workability, high hardness, and excellent coating adhesion with a metal material, and provide printability without using a solvent.

Technical Solution

According to an aspect of the present inventive concept, an ink composition for an inkjet printed steel plate may include a linear acrylate-based oligomer present in an amount of 110 to 50% by weight, a reactive acrylate-based monomer present in an amount of 190 to 75% by weight, an ultraviolet curable initiator present in an amount of 0.1% to 15% by weight, at least one selected from the group consisting of a dye and a pigment present in an amount of 0.5% to 10% by weight, and at least one selected from the group consisting of an antioxidant, an antifoaming agent, and a dispersant present in an amount of 0.10 to 10% by weight, based on the overall weight of the ink composition.

The ink composition for the inkjet printed steel plate may further include a linear acrylate-based monomer having an inorganic particle attached thereto, present in an amount of 0.10 to 15% by weight based on the overall weight of the ink composition.

The linear acrylate-based monomer may include at least one selected from the group consisting of a linear epoxy acrylate oligomer and a linear urethane acrylate oligomer.

The linear epoxy acrylate oligomer may include at least one selected from the group consisting of a cycloaliphatic epoxy acrylate oligomer, an aliphatic polyglycidyl epoxy acrylate oligomer, and a glycidyl amine epoxy acrylate oligomer.

The linear urethane acrylate oligomer may include an aliphatic urethane acrylate oligomer.

The reactive acrylate-based monomer may include a branch-type monomer having a benzene ring or a hyperbranch-type monomer having no benzene ring.

The reactive acrylate-based monomer may include at least one selected from the group consisting of phenoxyethyl (meth)acrylate, bisphenol A diglycidyl ether di(meth)acrylate, and trimethylolpropane triacrylate.

The inorganic particle may include at least one selected from the group consisting of silica, titanium dioxide, and aluminum oxide.

The inorganic particle may be a spherical inorganic particle having a diameter in a range of 2 to 500 mm.

The linear acrylate-based monomer may include at least one selected from the group consisting of isobornyl acrylate, isobornyl methacrylate, tetrahydrofuryl acrylate, tripropylene glycol diacrylate, 1,6-hexanediol diacrylate, and pentaerythritol triacrylate.

The ultraviolet curable initiator may include at least one selected from the group consisting of 2,2-dimethoxy-2-phenylacetophenone, 1-hydroxycyclohexyl phenyl ketone, 1-(4-isopropylphenyl)-2-hydroxy-2-methylpropane-1-one, 1,1-dimethoxy deoxybenzoin, 3,3'-dimethyl-4-methoxybenzophenone, 1-(4-dodecyl phenyl)-2-hydroxy-2-methylpropan-1-one, 2-methyl-1-[4-(methylthio)phenyl]-2-morpholinopropan-1-one, (2,4,6-trimethylbenzoyl) diphenylphosphine oxide, ethyl(2,4,6-trimethylbenzoyl) phenylphosphinate, bis(acyl)phosphine oxide, methyl benzoylformate, 4-benzoyl-4'-methyldiphenylsulfide, benzyl dimethyl ketal, fluorenone, fluorene, benzaldehyde, benzophenone, anthraquinone, and xantone.

A viscosity of the ink composition may be in a range of 1 to 50 cps, when measured at 25° C.

According to another aspect of the present inventive concept, an inkjet printed steel plate may include an inkjet printed layer in which the ink composition for the inkjet printed steel plate is printed on one or both surfaces of a steel plate.

The steel plate may include at least one selected from the group consisting of a cold-rolled steel plate, a hot-rolled steel plate, a galvanized steel plate, an aluminized steel plate, a color-coated steel plate, a stainless steel plate, a magnesium steel plate, an aluminum steel plate, a zinc steel plate, and a titanium steel plate.

The inkjet printed steel plate may further include a transparent coating layer or a transparent film layer on the inkjet printed layer.

The transparent coating layer may include at least one selected from the group consisting of an ultraviolet curable clear coating layer, a polyester-based resin layer having a molecular weight of 3,000 to 25,000, a fluorine resin coating layer, and an unsaturated polyester-based resin layer having self-cleaning properties.

The transparent film layer may include at least one selected from the group consisting of polyester phthalate, polypropylene, polyethylene, and ethyl vinyl acetate.

A thickness of the transparent film layer may be in a range of 10 to 150 μm.

The inkjet printed steel plate may further include at least one selected from the group consisting of a plating layer, a pretreatment layer, a primer layer, and a color coating layer, disposed between the steel plate and the inkjet printed layer.

According to another aspect of the present inventive concept, a method of fabricating an inkjet print steel layer may include supplying the ink composition for the inkjet printed steel plate to an inkjet head, and spraying and printing the ink composition for the inkjet printed steel plate on one or both surfaces of a steel plate using an inkjet printing process.

The method of fabricating an inkjet print steel layer may further include curing the ink composition printed on the steel plate with ultraviolet (UV) irradiation.

The steel plate may include at least one selected from the group consisting of a cold-rolled steel plate, a hot-rolled steel plate, a galvanized steel plate, an aluminized steel plate, a color-coated steel plate, a stainless steel plate, a magnesium steel plate, an aluminum steel plate, a zinc steel plate, and a titanium steel plate.

Advantageous Effects

As set forth above, an ink composition for an inkjet printed steel plate according to an example embodiment of the present inventive concept can improve adhesion, hardness, or the like so as to be applied to various metal materials such as steel plates. The ink composition for the inkjet printed steel plate according to the example embodiment of the present inventive concept can be manufactured using a simple process, compared to a conventional silkscreen printed steel plate or a conventional roll printed steel plate. In addition, the ink composition for the inkjet printed steel plate according to the example embodiment of the present inventive concept can implement a high-resolution product, and can be applied to a steel surface, to which it is difficult to apply a conventional inkjet ink composition.

In addition, since an ultraviolet (UV)-curable composition is used instead of a water-based/oil-based resin composition dried by heat, the ink composition for the inkjet printed steel plate according to the example embodiment of the present inventive concept can improve productivity in an environmentally friendly manner, without using a solvent.

MODES FOR CARRYING OUT THE INVENTION

Hereinafter, example embodiments of the present inventive concept will be described with reference to the accompanying drawings. The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

According to an example embodiment of the present inventive concept, and ink composition for an inkjet printed steel plate may include, a linear acrylate-based oligomer present in an amount of 11% to 50% by weight, a reactive acrylate-based monomer present in an amount of 19% to 75% by weight, an ultraviolet (UV) curable initiator present in an amount of 0.1% to 15% by weight, at least one selected from the group consisting of a dye and a pigment present in an amount of 0.5% to 10% by weight, and at least one selected from the group consisting of an antioxidant, an antifoaming agent, and a dispersant present in an amount of 0.1% to 10% by weight, based on the overall weight of the composition.

The linear acrylate-based oligomer may preferably include at least one of a linear epoxy acrylate-based oligomer or a linear urethane acrylate-based oligomer. Here, the linear acrylate-based oligomer may preferably include two or more functional groups. Conventionally, the epoxy acrylate-based oligomer may use a compound having a resin composition and a benzene ring, such as bisphenol and bisphenol F. However, the linear acrylate-based oligomer may preferably include at least one compound selected from the group consisting of a cycloaliphatic epoxy acrylate, an aliphatic polyglycidyl type epoxy acrylate, a glycidyl amine type epoxy acrylate, which has no benzene ring in a main chain. The oligomer may serve to improve adhesion of a coating film to a steel plate, as well as hardness.

In addition, since the urethane acrylate-based oligomer is an aliphatic urethane acrylate-based oligomer, it is preferable to ensure the weatherability and flexibility of the coating film by including an isocyanate-urethane bond.

Here, the ink composition for the inkjet printed steel plate may preferably contain the linear acrylate-based oligomer in an amount of 11 to 50% by weight, more preferably in an amount of 20 to 50% by weight. When the content of the linear acrylate-based oligomer is lower than 11% by weight, the coating film may have poor flexibility and become excessively brittle. When the content of the linear acrylate-based oligomer exceeds 50% by weight, the ink composition may be sprayed in a small amount due to high viscosity, and thereby may not be used in large quantities for the inkjet printed steel plate.

The reactive acrylate-based monomer may preferably include a branch-type monomer having a benzene ring in the main chain thereof or a star-shaped hyperbranch-type monomer having no benzene ring. Compared to a conventional linear monomer having trouble in controlling viscosity and securing stable physical properties, the branch-type monomer or hyperbranch-type monomer according to the example embodiment of the present inventive concept may serve to improve flowability of an ink solution and control viscosity of the ink solution, thereby enabling stable ink ejection without using a solvent.

In addition, since the branch-type monomer includes the benzene ring in the main chain, the branch-type monomer may be thermally stable and have superior chemical resistance and strong adhesion, as compared to a linear monomer having the same molecular weight.

The reactive acrylate-based monomer may include at least one selected from the group consisting of phenoxyethyl (meth)acrylate, bisphenol A diglycidyl ether di(meth)acrylate, and trimethylolpropane triacrylate.

Here, the reactive acrylate-based monomer may preferably be present in an amount of 19 to 75% by weight, more preferably, present in an amount of 19 to 71% by weight, and yet more preferably, present in an amount of 19 to 66% by weight, based on the overall weight of the ink composition for the inkjet printed steel plate. When the content of the reactive acrylate-based monomer is lower than 19% by weight, the viscosity of the entire composition may be high, resulting in low ink dispensability. When the content of the reactive acrylate-based monomer exceeds 19% by weight, bending workability of a coating layer may be degraded.

Meanwhile, the ink composition for the inkjet printed steel plate may preferably further include a linear acrylate-based monomer with an inorganic particle attached thereto. Here, the inorganic particle may preferably include at least one selected from the group consisting of silica, titanium dioxide, and aluminum oxide. The inorganic particle may be preferably chemically attached to a monomer having a carboxyl group and a hydroxyl group.

The linear acrylate-based monomer may preferably include, for example, at least one selected from the group consisting of isobornyl acrylate (IBOA), isobornyl methacrylate, tetrahydrofuryl acrylate (THFA), tripropylene glycol diacrylate (TPGDA), 1,6-hexanediol diacrylate (HDDA), and pentaerythritol triacrylate.

A method of attaching inorganic particles to monomers is disclosed in Korea Unexamined Patent Application Publication No. 2015-0006714, in which a method of attaching silica power to a polymer resin is described. For example, the inorganic particles may be attached by organically reacting 100 parts by weight of the inorganic particles, 100 parts by weight of monomers having a carboxyl group and a hydroxyl group, and 500 parts by weight of a solvent at 50° C. for at least 6 hours in a nitrogen atmosphere. In some cases, a commercialized silica-attached UV-curable reactive acrylate monomer may be used, but is not limited thereto.

Meanwhile, the shape of the inorganic particle attached to the linear acrylate-based monomer is not specifically limited to being, for example, a spherical shape or a flat shape. However, the inorganic particle may preferably have the spherical shape to be sprayed in an inkjet solution. That is, since the inorganic particle having the flat shape is liable to damage a head nozzle while being sprayed from an inkjet head, the inorganic particle having the spherical shape may be preferably used. Here, a diameter of the inorganic particle may be preferably in the range of 2 to 500 nm, more preferably in the range of 50 to 300 nm. When the diameter the inorganic particle is less than 2 nm, the effect of the inorganic particle may be degraded. When the diameter the inorganic particle is greater than 500 nm, the head nozzle may be clogged due to spraying of the inkjet solution.

Here the linear acrylate-based monomer having to which the inorganic particle is attached may preferably be present in an amount of 0.1% to 15% by weight, more preferably present in an amount of 3 to 10% by weight, based on the overall weight of the ink composition for the inkjet printed steel plate. Here, when the content of the linear acrylate-based monomer having to which the inorganic particle is lower than 0.1% by weight, the hardness and corrosion resistance of the coating film may be degraded. When the content of the linear acrylate-based monomer having to which the inorganic particle is higher than 15% by weight, the viscosity of the solution may increase and the coating layer may become brittle.

The UV-curable initiator may be at least one selected from the group consisting of 2,2-dimethoxy-2-phenylacetophenone, 1-hydroxycyclohexyl phenyl ketone, 1-(4-isopropylphenyl)-2-hydroxy-2-methylpropane-1-one, 1,1-dimethoxy deoxybenzoin, 3,3'-dimethyl-4-methoxybenzophenone, 1-(4-dodecyl phenyl)-2-hydroxy-2-methylpropan-1-one, 2-methyl-1-[4-(methylthio)phenyl]-2-morpholinopropan-1-one, (2,4,6-trimethylbenzoyl)diphenylphosphine oxide, ethyl(2,4,6-trimethylbenzoyl)phenylphosphinate, bis(acyl) phosphine oxide, methyl benzoylformate, 4-benzoyl-4'-methyldiphenylsulfide, benzyl dimethyl ketal, fluorenone, fluorene, benzaldehyde, benzophenone, anthraquinone, and xantone.

In addition, the UV-curable initiator may include, for example, Irgacure184, Irgacure500, Irgacure651, Irgacure907, Irgacure369, Irgacure784, Darocure1173, Darocure1116, Darocure2959, Lucirin TPO, Escacure KIP150, Escacure KIP100F, Escacure EDB, and Escacure KT37, which are widely available on the market.

In addition, the UV-curable initiator may be present in an amount of 0.1% to 15% by weight, preferably in an amount of 5% to 10% by weight, based on the overall weight of the ink composition for the inkjet printed steel plate. Here, when the content of the UV-curable initiator is lower than 0.1% by weight, a photocuring effect may be very limited. When the content of the UV-curable initiator exceeds 15% by weight, coating adhesion may be decreased during photocuring, or physical properties of the coating layer may be degraded due to uncured residues.

Meanwhile, the ink composition for the inkjet printed steel plate may include at least one selected from the group consisting of the dye and the pigment for coloring with various, more preferably an inorganic pigment. Dyes or pigments of various colors, such as black, white, red, blue, and yellow, may be used according to a selection of a user.

Here, the content of at least one selected from the group consisting of the dye and pigment may be in a range of 0.5 to 10% by weight, more preferably 3 to 5% by weight, based on the overall weight of the ink composition for the inkjet printed steel plate. Here, when the content of at least one selected from the group consisting of the dye and pigment is lower than 0.5% by weight, a color-shielding effect may decrease, resulting in product degradation. When the content of at least one selected from the group consisting of the dye and pigment exceeds 10% by weight, excessively-added dye or pigment may cause agglomeration of the ink solution.

Meanwhile, the ink composition for the inkjet printed steel plate may include at least one selected from the group consisting of an antioxidant, an antifoaming agent, and a dispersant, as additives. The content of the additives may be within a range in which physical properties of the ink composition for the inkjet printed steel plate are not changed. The content of the additives may be preferably in a range of 0.1 to 10% by weight, more preferably 3 to 6% by weight, based on the overall weight of the ink composition for the inkjet printed steel plate, but is not limited thereto.

The antioxidant may include, for example, Irganox 1010, Irganox 1035, Irganox 1076, Irganox 1222 (Ciba Specialty Chemicals Inc, Japan), or the like, but is not limited thereto. In addition, the antifoaming agent may include, for example, TEGO Airex 920, TEGO Airex 932, BYK 088, BYK 1790, or the like, but is not limited thereto.

In addition, the dispersant may be selected from products supplied by commercial suppliers of the additives, such as Disperbyk™ from BYK Chemie GmbH, TEGO™ Dispers from EVONIK GmbH, Dispex™ and Efke™ from CIBA Specialty Chemicals Inc, or the like, but is not limited thereto.

Meanwhile, the viscosity of the ink composition for the inkjet printed steel plate may be preferably 1 to 50 cps (centi-poises), more preferably 3 to 30 cps, measured at 25° C. When the viscosity is less than 1 cps, physical properties of the coating layer may be degraded while ink dispensability is improved. When the viscosity exceeds than 50 cps, it may be difficult to spray the ink composition. Accordingly, the ink composition needs to have an appropriate viscosity.

Meanwhile, an inkjet printed steel plate according to an example embodiment of the present inventive concept may include an inkjet printed layer in which the ink composition for the inkjet printed steel plate is printed on one or both surfaces of a steel plate.

Here, the steel plate may preferably include at least one selected from the group consisting of a cold-rolled steel plate, a hot-rolled steel plate, a galvanized steel plate, an aluminized steel plate, a color-coated steel plate, a stainless steel plate, a magnesium steel plate, an aluminum steel plate, a zinc steel plate, and a titanium steel plate.

Further, the inkjet printed steel plate may be finished with an inkjet printed layer only, or may further include a transparent coating layer or a transparent film layer on the inkjet printed layer.

Here, the transparent coating layer may preferably include at least one selected from the group consisting of a UV-curable clear coating layer cured by light, a polyester-based resin layer having a molecular weight of 3,000 to 25,000, a fluorine resin coating layer, and an unsaturated polyester-based resin layer having self-cleaning properties, but is not limited thereto.

In addition, the transparent film layer may preferably include at least one selected from the group consisting of polyester phthalate, polypropylene, polyethylene, and ethyl vinyl acetate and have a thickness in a range of 10 to 150 µm, but is not limited thereto.

The inkjet printed steel plate may further preferably include at least one selected from the group consisting of a plating layer, a pretreatment layer, a primer layer, and a color coating layer, disposed between the steel plate and the inkjet printed layer.

Figure 1:
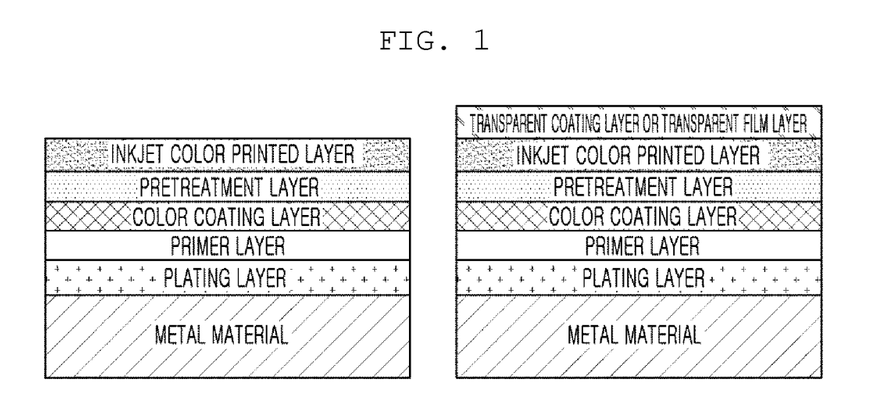
FIG. 1 is a schematic diagram illustrating an inkjet printed steel plate according to an example embodiment of the present inventive concept.

For example, FIGS. 1 to 5 are diagrams illustrating inkjet printed steel plates fabricated using an ink composition for an inkjet printed steel plate according to example embodiments of the present inventive concept. FIG. 1 is a diagram illustrating a structure in which a printed layer is applied to a color coating steel plate, that is, a structure having an inkjet printed steel plate fabricated according to a conventional process and an inkjet color printed layer including an ink composition for inkjet printed steel plate according to an example embodiment of the present inventive concept. The inkjet printed steel plate may include a metal material, a plating layer, a pretreatment layer, a primer layer, and a color coating layer. The structure may further include a transparent coating layer or a transparent film layer.

Figure 2:
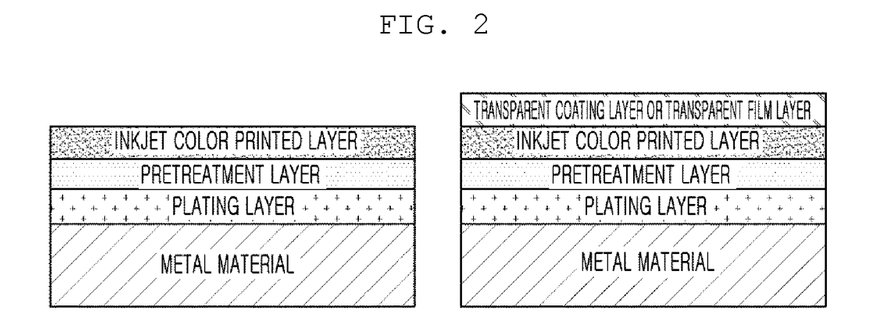
FIG. 2 is a schematic diagram illustrating an inkjet printed steel plate according to another example embodiment of the present inventive concept.
Figure 3:
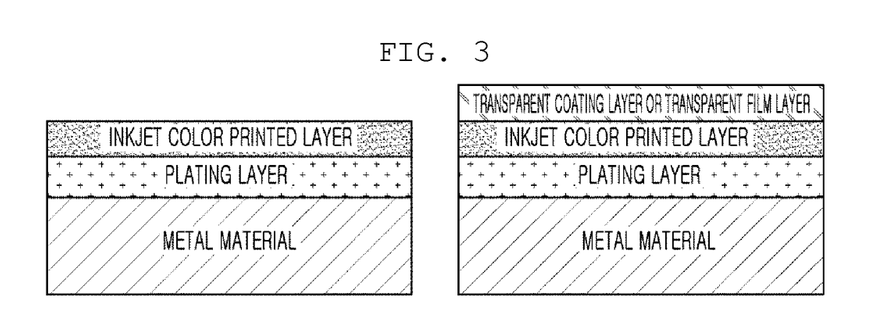
FIG. 3 is a schematic diagram illustrating an inkjet printed steel plate according to another example embodiment of the present inventive concept.

In addition, FIGS. 2 and 3 are diagrams illustrating structures in which a primer layer and a color coating layer are omitted from the inkjet printed steel plate illustrated in FIG. 1. The structures illustrated in FIGS. 2 and 3 are advantageous in terms of economy. FIG. 2 illustrates a structure including a metal material, a plating layer, a pretreatment layer, and an inkjet color printed layer. The structure may further include a transparent coating layer or a transparent film layer. FIG. 3 illustrates a structure including a metal material, a plating layer, and an inkjet color printed layer. The structure may further include a transparent coating layer or a transparent film layer.

Figure 4:
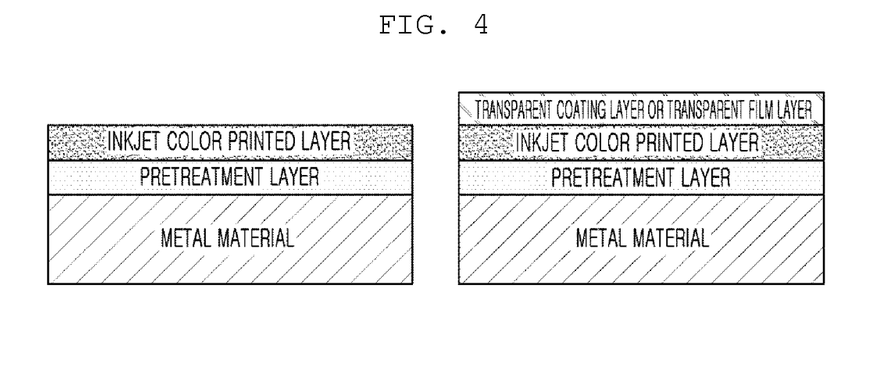
FIG. 4 is a schematic diagram illustrating an inkjet printed steel plate according to another example embodiment of the present inventive concept.
Figure 5:
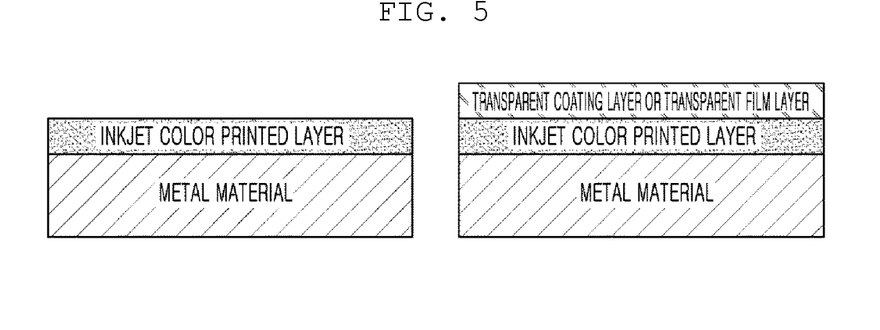
FIG. 5 is a schematic diagram illustrating an inkjet printed steel plate according to another example embodiment of the present inventive concept.
Figure 6:
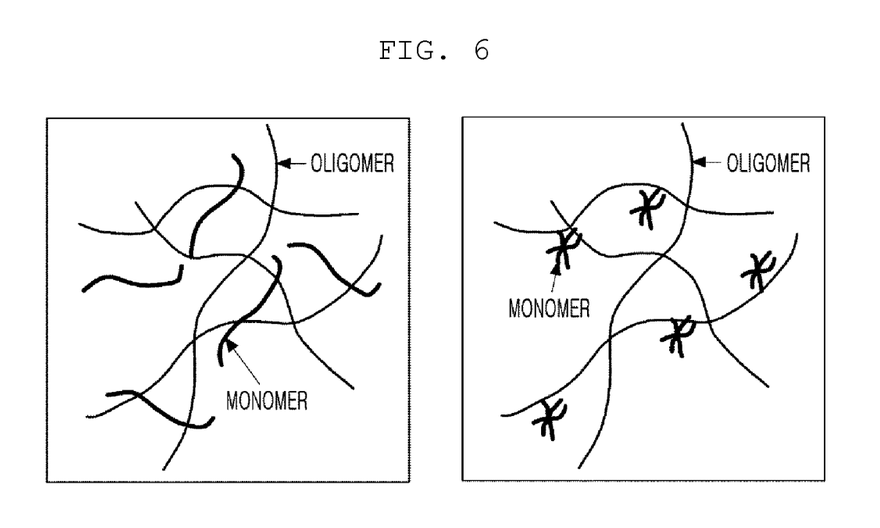
FIG. 6 is a schematic diagram illustrating an inkjet composition including linear monomers according to a conventional technology (left), and an inkjet composition including hyperbranch-type monomers according to an example embodiment of the present inventive concept (right)

In addition, FIGS. 4 and 5 are diagrams illustrating a structure including an inkjet printed steel plate with no plating layer. The structure may be suitable for products that need to express the texture of a material, such as a stainless steel material or a magnesium material. FIG. 4 illustrates a structure including a metal material, a pretreatment layer, and an inkjet color printed layer. The structure may further include a transparent coating layer or a transparent film layer. FIG. 5 illustrates a structure including a metal material and an inkjet color printed layer, a pretreatment layer, and an inkjet color printed layer. The structure may further include a transparent coating layer or a transparent film layer.

That is, the inkjet printed steel plate according to the example embodiment of the present inventive concept may have various structures as illustrated in FIGS. 1 to 5, and is not limited thereto.

Further, according to another example embodiment of the present inventive concept, a method of fabricating an inkjet printed steel plate may include supplying an ink composition for an inkjet printed steel plate to an inkjet head, and spraying and printing the ink composition for the inkjet printed steel plate on one or both surfaces of the steel plate, using an inkjet printing process.

Here, the method of fabricating an inkjet printed steel plate according to the example embodiment of the present inventive concept may further include a curing process in which the ink composition printed on a steel plate is cured by ultraviolet (UV) light. Here, a light source for the UV-curing process may include a metal halide bulb, a mercury bulb, or an H bulb, a D bulb, or a V bulb, having no electrode, but is not limited thereto. Meanwhile, the intensity of the UV light may be adjusted selectively within a range from 100 to 3000 mJ/cm², according to the composition of the ink composition.

Like Comparative Example 1 above, other ink compositions for inkjet printed steel plates according to Example Embodiments 1 to 10 and Comparative Examples 2 to 3 were fabricated to have compositions listed below in Table 1.

TABLE 1

|   | C. EX. 1 | Ex. 1 | Ex. 2 | Ex. 3 | Ex. 4 | Ex. 5 | C. EX. 2 | C. EX. 3 | Ex. 6 | Ex. 7 | Ex. 8 | Ex. 9 | Ex. 10 |
|---|---|---|---|---|---|---|---|---|---|---|---|---|---|
| A | 76 | 50 | 35 | 20 | 15 | 11 | 5 | 2 | 50 | 50 | 50 | 50 | 50 |
| B | 10 | 36 | 51 | 66 | 71 | 75 | 81 | 84 | 42.5 | 41 | 31 | 24 | 19 |
| C | 3 | 3 | 3 | 3 | 3 | 3 | 3 | 3 | 0.5 | 3 | 5 | 10 | 10 |
| D | 7 | 7 | 7 | 7 | 7 | 7 | 7 | 7 | 3 | 3 | 10 | 10 | 15 |
| E | 3 | 3 | 3 | 3 | 3 | 3 | 3 | 3 | 3 | 2 | 3 | 5 | 5 |
| F | 0.5 | 0.5 | 0.5 | 0.5 | 0.5 | 0.5 | 0.5 | 0.5 | 0.5 | 0.5 | 0.5 | 0.5 | 0.5 |
| G | 0.5 | 0.5 | 0.5 | 0.5 | 0.5 | 0.5 | 0.5 | 0.5 | 0.5 | 0.5 | 0.5 | 0.5 | 0.5 |

Ex.: Example Embodiment
C. Ex.: Comparative Example
A: Bifunctional Acrylate
B: Trimethylolpropane Triacrylate
C: Pigment
D: Photoinitiator
E: Antioxidant
F: Antifoaming agent
G: Dispersant Meanwhile, the steel plate may preferably include at least one selected from the group consisting of a cold-rolled steel plate, a hot-rolled steel plate, a galvanized steel plate, an aluminized steel plate, a color-coated steel plate, a stainless steel plate, a magnesium steel plate, an aluminum steel plate, a zinc steel plate, and a titanium steel plate, but is not limited thereto.

MODES FOR INVENTION

Hereinafter, example embodiments of the present inventive concept will be described in more detail. However, the following example embodiments are provided for illustrative examples only and should not be construed as limiting the scope of the invention.

Example Embodiments 1 to 8 and Comparative Examples 1 to 5

As listed in Table 1 below, an ink composition for an inkjet printed steel plate according to Comparative Example 1 was fabricated by mixing a bifunctional epoxy acrylate (Sartomer, Korea) as a linear oligomer in an amount of 76% by weight, a hyperbranch-type trimethylolpropane triacrylate monomer (SK-Cytec, Korea) in an amount of 10% by weight, a pigment as a coloring agent in an amount of 3% by weight, a photoinitiator Irgacure 184 (Ciba, Switzerland) in an amount of 7% by weight, an antioxidant Irganox 1035 (Ciba, Switzerland) in an amount of 3% by weight, and an antifoaming agent TECO Airex 920 and a dispersant BYK-JET 9150 as other additives in an amount of 0.5% by weight each. The linear oligomer may be substituted by a urethane acrylate-based compound.

Next, the ink composition for the inkjet printed steel plate was printed on a cold-rolled steel plate having a width of 20 cm and a length of 20 cm, to have a printing thickness in a range of 0.5 to 20 μm using an inkjet printing process.

Next, the printed layer was dried by emitting ultraviolet (UV) light to the cold-rolled steel plate coated with the ink composition for the inkjet printed steel plate at a light intensity of 100 to 3000 mJ/cm², using a UV irradiator.

Comparative Examples 4 to 7

As listed in Table 2 below, an ink compositions for an inkjet printed steel plate according to Comparative Example 4 was fabricated by mixing a bifunctional epoxy acrylate (Sartomer, Korea) as a linear oligomer in an amount of 76% by weight, a linear monomer having no benzene ring in an amount of 10% by weight, a pigment as a coloring agent in an amount of 3% by weight, a photoinitiator IRGACURE 184 (Ciba, Switzerland) in an amount of 7% by weight, an antioxidant Irganox 1035 (Ciba, Switzerland) in an amount of 3% by weight, and an antifoaming agent TEGO Airex 920 and a dispersant Bykjet 9150 as other additives in an amount of 0.5% by weight each. Here, the linear monomer included an isobornyl acrylate (SK-Cytec, Korea) as a monofunctional acrylic acid ester monomer in an amount of 5% by weight and a tripropylene glycol diacrylate (Miwon Corporation, Korea) as a polyfunctional acrylic acid ester monomer in an amount of 5% by weight.

Next, a printed film test plate was fabricated according to the same method and conditions as in Comparative Example 1.

Other ink compositions for inkjet printed steel plates according to Comparative Examples 5 to 7 were fabricated by the same method as in Comparative Example 4, wherein components and contents of each ink composition for the inkjet printed steel plate are listed in Table 2 below. In particular, a content ratio of the monofunctional monomer to the polyfunctional monomer in the linear monomer was about 50:50.

TABLE 2

| Classification | C. Ex. 4 | C. Ex. 5 | C. Ex. 6 | C. Ex. 7 |
|---|---|---|---|---|
| Bifunctional Epoxy Acrylate | 76 | 50 | 35 | 20 |
| Isobonyl Acrylate & Tripropylene Glycol Diacrylate | 10 | 36 | 51 | 66 |
| Pigment | 3 | 3 | 3 | 3 |
| Photoinitiator | 7 | 7 | 7 | 7 |
| Antioxidant | 3 | 3 | 3 | 3 |
| Antifoaming Agent | 0.5 | 0.5 | 0.5 | 0.5 |
| Dispersant | 0.5 | 0.5 | 0.5 | 0.5 |

Example Embodiment 11 to 18 and Comparative Example 8

As listed in Table 3 below, an ink composition for an inkjet printed steel plate according to Comparative Example 8 was fabricated by mixing an epoxy acrylate (Sartomer, Korea) as a linear oligomer in an amount of 35% by weight, a hyperbranch-type trimethylolpropane triacrylate monomer (SK-CYTEC, KOREA) in an amount of 31% by weight, a linear monomer with silica attached thereto in an amount of 20% by weight, a pigment as a coloring agent in an amount of 3% by weight, a photoinitiator Irgacure 184 (Ciba, Switzerland) in an amount of 7% by weight, an antioxidant Irganox 1035 (Ciba, Switzerland) in an amount of 3% by weight, and an antifoaming agent TECO Airex 920 and a dispersant BYKJET 9150 as other additives in an amount of 0.5% by weight each.

Next, the ink composition for the inkjet printed steel plate was printed on a cold-rolled steel plate having a width of 20 cm and a length of 20 cm, to have a printing thickness in a range of 0.5 to 20 μm using an inkjet printing process.

Next, a printed film test plate was fabricated according to the same method and conditions as in Comparative Example 1.

Other ink compositions for inkjet printed steel plates according to Example Embodiments 11 to 18 were fabricated by the same method as in Comparative Example 8, wherein components and contents of each ink composition for the inkjet printed steel plate are listed in Table 3 below.

TABLE 3

| Classification | Comparative Example 8 | Example Embodiment 11 | 12 | 13 | 14 | 15 | 16 | 17 | 18 |
|---|---|---|---|---|---|---|---|---|---|
| Epoxy Acrylate | 35 | 35 | 35 | 35 | 35 | 35 | 35 | 35 | 35 |
| Trimethylolpropane Triacrylate Monomer | 31 | 36 | 41 | 43 | 46 | 48 | 49.5 | 50.5 | 50.9 |
| Silica-attached Monomer | 20 | 15 | 10 | 8 | 5 | 3 | 1.5 | 0.5 | 0.1 |
| Pigment | 3 | 3 | 3 | 3 | 3 | 3 | 3 | 3 | 3 |
| Photoinitiator | 7 | 7 | 7 | 7 | 7 | 7 | 7 | 7 | 7 |
| Antioxidant | 3 | 3 | 3 | 3 | 3 | 3 | 3 | 3 | 3 |
| Antifoaming agent | 0.5 | 0.5 | 0.5 | 0.5 | 0.5 | 0.5 | 0.5 | 0.5 | 0.5 |
| Dispersant | 0.5 | 0.5 | 0.5 | 0.5 | 0.5 | 0.5 | 0.5 | 0.5 | 0.5 |

Comparative Example 9 to 11

As listed in Table 4 below, an ink composition for an inkjet printed steel plate according to Comparative Example 9 was fabricated by mixing an bifunctional epoxy acrylate (Sartomer, Korea) as a linear oligomer in an amount of 35% by weight, a hyperbranch-type trimethylolpropane triacrylate monomer (SK-Cytec, Korea) in an amount of 35% by weight, silica in an amount of 20% by weight, a pigment as a coloring agent in an amount of 3% by weight, a photoinitiator IRGACURE 184 (Ciba, Switzerland) in an amount of 7% by weight, an antioxidant Irganox 1035 (Ciba, Switzerland) in an amount of 3% by weight, and an antifoaming agent TEGO Airex 920 and a dispersant Bykjet 9150 as other additives in an amount of 0.5% by weight each.

Next, a printed film test plate was fabricated according to the same method and conditions as in Comparative Example 1.

Other ink compositions for inkjet printed steel plates according to Comparative Examples 10 and 11 were fabricated by the same method as in Comparative Example 9, wherein components and contents of each ink composition for the inkjet printed steel plate are listed in Table 4 below.

TABLE 4

| Classification | Comparative Example 9 | Comparative Example 10 | Comparative Example 11 |
|---|---|---|---|
| Linear Oligomer | 35 | 35 | 35 |
| Benzene Ring-type Monomer | 31 | 41 | 46 |
| Silica | 20 | 10 | 5 |
| Pigment | 3 | 3 | 3 |
| Photoinitiator | 7 | 7 | 7 |
| Antioxidant | 3 | 3 | 3 |
| Antifoaming agent | 0.5 | 0.5 | 0.5 |
| Dispersant | 0.5 | 0.5 | 0.5 |

Experimental Embodiment

The ink compositions for the inkjet printed steel plates fabricated according to Example Embodiments 1 to 18 and Comparative Examples 1 to 11 were sprayed on surfaces of the steel plates using the inkjet printing process, and coating layers formed thereby were subjected to tests to measure corrosion resistance, pencil hardness, workability, coating adhesion, and ink dispensability, using methods described below. Results thereof are given in Tables 5 to 8 below.

(1) Evaluation of Corrosion Resistance

Corrosion resistance was tested by continuously spraying 5% saline solutions at 35° C. under a humidity of 95% for 240 hours. Results are classified into grades of Good, Medium, and Bad according to initial amounts of blusters.

Good: less than 5% blisters after 240 hours

Medium: no less than 5% and less than 50% blisters after 240 hours

Bad: no less than 50% blisters after 240 hours

Not measurable: unable to prepare a test plate due to poor ink dispensability (2) Evaluation of Pencil Hardness Pencil Hardness was tested by scratching cured coating layers with several pencils (2B, B, HB, F, H, 2H, and 3H) at an angle of 45 degrees in accordance with the JIS K-5400 pencil hardness method, using a pencil hardness tester, and evaluated in accordance with the severity of scratches detected in visual observation.

(3) Evaluation of Workability

The test plates were bent by 2T using a T-bend tester, and then the occurrence of peeling and cracks in the coating layers were visually observed.

Good: no cracks and peeling in a coating layer after the 3t bending process

Medium: occurrence of cracks but no peeling in a coating layer after the 3t bending process Bad: occurrence of cracks and peeling in a coating layer after the 3t bending process Not measurable: unable to prepare a test plate due to poor ink dispensability (4) Evaluation of Coating Adhesion Coating Adhesion was evaluated in accordance with ISO 2409 relating to a coating adhesion test method. That is, after drawing 11 lines vertically and horizontally in an interval of 1 mm on a test plate, attaching cellophane tape thereto, and removing the cellophane tape therefrom, the number of pieces remaining in the coating layer, from among 100 separate pieces of the coating layer, was counted, thereby evaluating coating adhesion.

(5) Evaluation of Ink Dispensability

Ink Dispensability is a characteristic for evaluating spraying performance when an ink composition for an inkjet printed steel plate is inserted into an inkjet head and sprayed onto a surface of an adherend. That is, ink dispensability is visually evaluated by checking if the ink composition is sprayed on a precise location to be printed at a precise size, without clogging the nozzles.

Good: no clogging in the nozzle and no problem in ink dispensability

Bad: clogging in the nozzle or unable to spray ink ability was degraded while ink dispensability was good. In addition, the coating adhesion became poor.

As a whole, the corrosion resistance is good due to crosslinking properties of the oligomer and the monomer. In particular, when the content of the oligomer is 5% by weight or less, workability is degraded and 50% or more peelings are found in the evaluation of coating adhesion.

TABLE 6

| Classification | Comparative Example 4 | Comparative Example 5 | Comparative Example 6 | Comparative Example 7 |
|---|---|---|---|---|
| Corrosion Resistance (240 hours) | Not measurable | Not measurable | Not measurable | Medium |
| Pencil Hardness | Not measurable | Not measurable | Not measurable | F |
| Workability (3t bending) | Not measurable | Not measurable | Not measurable | Good |
| Coating Adhesion | Not measurable | Not measurable | Not measurable | 10% peeling |
| Ink Dispensability | Bad | Bad | Bad | Good |

TABLE 5

| | C. Ex. 1 | Ex. 1 | Ex. 2 | Ex. 3 | Ex. 4 | Ex. 5 | C. Ex. 2 | C. Ex. 3 | Ex. 6 | Ex. 7 | Ex. 8 | Ex. 9 | Ex. 10 |
|---|---|---|---|---|---|---|---|---|---|---|---|---|---|
| Corrosion Resistance (240 hrs) | Not measurable | Good | Good | Good | Good | Good | Good | Good | Good | Good | Good | Good | Good |
| Pencil Hardness | Not measurable | HB | F | H | H | H | H | H | F | F | F | F | HB |
| Workability (3t bending) | Not measurable | Good | Good | Good | Good | Medium | Bad | Bad | Good | Good | Good | Good | Good |
| Coating Adhesion | Not measurable | No peeling | No peeling | No peeling | 10% peeling | 10% peeling | 50% or more peeling | 50% or more peeling | No peeling | No peeling | No peeling | No peeling | No peeling |
| Ink Dispensability | Bad | Good | Good | Good | Good | Good | Good | Good | Good | Good | Good | Good | Good |

As given in Table 5, since the content of the linear oligomers in Comparative Example 1 was too high, the viscosity was so high that the ink composition was not sprayed. Accordingly, the test plate for measuring physical properties was not prepared.

As the content of the reactive monomer increased, the ink dispensability was improved and pencil hardness increased. However, when the content of the benzene ring-type monomer or the hyperbranch-type monomer exceeded 75% by weight as shown in Comparative Examples 2 to 3, work- Results of evaluation given in Table 6 were obtained in Comparative Examples 4 to 7, which have linear monomers, rather than hyperbranch-type monomers or branch-type monomers with benzene rings according to example embodiments of the present inventive concept. When using the linear monomers, viscosity increased, resulting in degradation in ink dispensability. When excessive monomers were included, the overall physical properties were poor, while ink dispensability was good. As a result, it can be seen that it is necessary to control viscosity of a conventional UV-curable inkjet ink solution by diluting a solvent.

TABLE 7

| Classification | C. Ex. 8 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Corrosion Resistance (240 hours) | Good | Good | Good | Good | Good | Good | Good | Good | Good |
| Pencil Hardness | 5H | 4H | 3H | 2H | 2H | 2H | H | H | F |
| Workability (3t bending) | Bad | Medium | Good | Good | Good | Good | Good | Good | Good |

TABLE 7-continued

| Classification | C. Ex. 8 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Coating Adhesion | No peeling | No peeling | No peeling | No peeling | No peeling | No peeling | No peeling | No peeling | No peeling |
| Ink Dispensability | Good | Good | Good | Good | Good | Good | Good | Good | Good |

Results given in Table 7 are physical properties obtained in printed coating layers according to Comparative Example 8 and Example Embodiments 11 to 18, which have monomers with inorganic particles attached thereto.

As the content of the monomers with inorganic particles attached thereto increased, the pencil hardness increased from F to 5H. However, when the content of the monomers with inorganic particles attached thereto exceeded 15% by weight as shown in Comparative Example 8, the coating layer became brittle, and thereby it was difficult to secure workability. However, the coating layer may be used as a printing solution applied to a product group that does not require processing. Accordingly, the content of the monomers with inorganic particles attached thereto may be preferably in the range of 0.1% to 15% by weight.

Other physical properties, such as corrosion resistance, the coating adhesion, and the ink dispensability, were good on the whole.

TABLE 8

| Classification | Comparative Example 9 | Comparative Example 10 | Comparative Example 11 |
|---|---|---|---|
| Corrosion Resistance (240 hours) | Not measurable | Not measurable | Good |
| Pencil Hardness | Not measurable | Not measurable | H |
| Workability (3t bending) | Not measurable | Not measurable | Medium |
| Coating Adhesion | Not measurable | Not measurable | No peeling |
| Ink Dispensability | Bad | Bad | Good |

Figure 7:
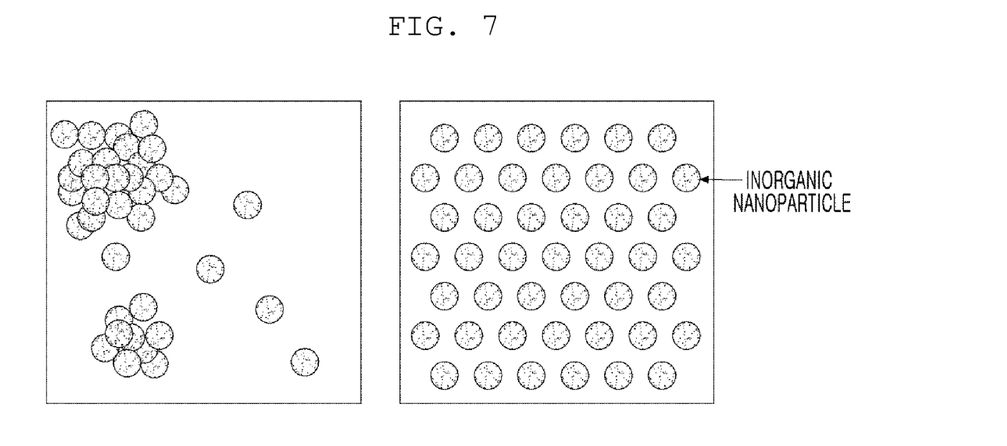
FIG. 7 is a schematic diagram illustrating a structure in which conventional inorganic particles are dispersed (left) and a structure in which monomers having inorganic particles attached thereto are dispersed (right)
Figure 8:
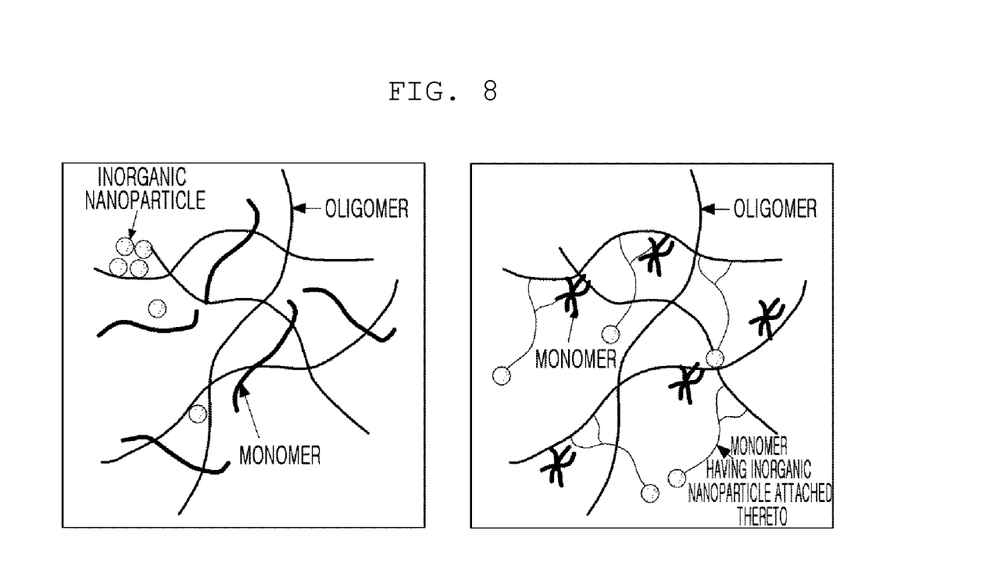
FIG. 8 is a schematic diagram illustrating a configuration of oligomers, monomers, and inorganic particles according to a conventional technology (left), and a configuration of oligomers, monomers, and monomers with inorganic particles attached thereto to an example embodiment of the present inventive concept (right).

Results given in Table 8 were obtained by adding inorganic particles (spherical silica) only, instead of the monomers with inorganic particles attached thereto. As a result, when the content of the inorganic particles exceeded about 5% by weight, the ink dispensability became poor. Accordingly, the test plate for measuring physical properties was not prepared (Not measurable). In addition, microcracks are found in the evaluation of workability of Comparative Example 11. As illustrated in FIGS. 7 and 8, distribution of silica particles is nonuniform.

The invention claimed is:

1. An ink composition for an inkjet printed steel plate, comprising:
a linear acrylate-based oligomer present in an amount of 11% to 50% by weight, based on an overall weight of an ink composition;
a reactive acrylate-based monomer present in an amount of 19% to 75% by weight, based on the overall weight of the ink composition;
a linear acrylate-based monomer having a silica particle attached thereto, present in an amount of 0.1% to 15% by weight based on the overall weight of the ink composition;
an ultraviolet curable initiator present in an amount of 0.1% to 15% by weight, based on the overall weight of the ink composition;
at least one selected from the group consisting of a dye and a pigment, present in an amount of 0.5% to 10% by weight, based on the overall weight of the ink composition; and
at least one selected from the group consisting of an antioxidant, an antifoaming agent, and a dispersant, present in an amount of 0.1% to 10% by weight, based on the overall weight of the ink composition.

2. The ink composition for the inkjet printed steel plate of claim 1, wherein the linear acrylate-based oligomer includes at least one selected from the group consisting of a linear epoxy acrylate oligomer and a linear urethane acrylate oligomer.

3. The ink composition for the inkjet printed steel plate of claim 2, wherein the linear epoxy acrylate oligomer includes at least one selected from the group consisting of a cycloaliphatic epoxy acrylate oligomer, an aliphatic polyglycidyl epoxy acrylate oligomer, and a glycidyl amine epoxy acrylate oligomer.

4. The ink composition for the inkjet printed steel plate of claim 2, wherein the linear urethane acrylate oligomer includes an aliphatic urethane acrylate oligomer.

5. The ink composition for the inkjet printed steel plate of claim 1, wherein the reactive acrylate-based monomer includes a branch monomer having a benzene ring or a hyperbranch monomer having no benzene ring.

6. The ink composition for the inkjet printed steel plate of claim 1, wherein the reactive acrylate-based monomer includes at least one selected from the group consisting of phenoxyethyl(meth)acrylate, bisphenol A diglycidyl ether di(meth)acrylate, and trimethylolpropane triacrylate.

7. The ink composition for the inkjet printed steel plate of claim 1, wherein the silica particle includes a spherical silica particle having a diameter in a range of 2 nm to 500 nm.

8. The ink composition for the inkjet printed steel plate of claim 1, wherein the linear acrylate-based monomer includes at least one selected from the group consisting of isobornyl acrylate, isobornyl methacrylate, tetrahydrofuryl acrylate, tripropylene glycol diacrylate, 1,6-hexanediol diacrylate, and pentaerythritol triacrylate.

9. The ink composition for the inkjet printed steel plate of claim 1, wherein the ultraviolet curable initiator includes at least one selected from the group consisting of 2,2-dimethoxy-2-phenylacetophenone, 1-hydroxycyclohexyl phenyl ketone, 1-(4-isopropylphenyl)-2-hydroxy-2-methylpropane-1-one, 1,1-dimethoxy deoxybenzoin, 3,3'-dimethyl-4-methoxybenzophenone, 1-(4-dodecyl phenyl)-2-hydroxy-2-methylpropan-1-one, 2-methyl-144-(methylthio)phenyl]-2-morpholinopropan-1-one, (2,4,6-trimethylbenzoyl) diphenylphosphine oxide, ethyl(2,4,6-trimethylbenzoyl) phenylphosphinate, bis(acyl)phosphine oxide, methyl benzoylformate, 4-benzoyl-4'-methyl di phenyl sulfide, benzyl dimethyl ketal, fluorenone, fluorene, benzaldehyde, benzophenone, anthraquinone, and xantone.

10. The ink composition for the inkjet printed steel plate of claim 1, wherein the ink composition has a viscosity in a range of 1 to 50 cps, when measured at 25° C.

11. An inkjet printed steel plate, comprising:
a steel plate; and
an inkjet printed layer formed on one or both surface of the steel plate, the inkjet printed layer comprising: an ink composition of claim 1.

12. The inkjet printed steel plate of claim 11, further comprising a transparent coating layer or a transparent film layer formed on the inkjet printed layer.

13. The inkjet printed steel plate of claim 12, wherein the transparent coating layer includes at least one selected from the group consisting of an ultraviolet curable clear coating layer, a polyester-based resin layer having a molecular weight of 3,000 to 25,000, a fluorine resin coating layer, and an unsaturated polyester-based resin layer having self-cleaning properties.

14. The inkjet printed steel plate of claim 12, wherein the transparent film layer includes at least one selected from the group consisting of polyester phthalate, polypropylene, polyethylene, and ethyl vinyl acetate.

15. The inkjet printed steel plate of claim 12, wherein the transparent film layer has a thickness in a range of 10 to 150 µm.

16. The inkjet printed steel plate of claim 11, further comprising at least one selected from the group consisting of a plating layer, a pretreatment layer, a primer layer, and a color coating layer, disposed between the steel plate and the inkjet printed layer.

17. A method of fabricating an inkjet printed steel plate, comprising:
supplying an ink composition of claim 1 to an inkjet head; and
spraying and printing the ink composition on one or both surfaces of a steel plate, using an inkjet printing process, to form an inkjet printed layer on the steel plate.

18. The method of claim 17, further comprising:
curing the sprayed or printed ink composition with ultraviolet (UV) irradiation.

* * * * *